United States Patent
Chenu

(10) Patent No.: US 8,413,539 B2
(45) Date of Patent: Apr. 9, 2013

(54) COMPACT MANIPULATION ROBOT

(75) Inventor: Jean-Marie Chenu, Nantes (FR)

(73) Assignee: Marel Food Systems HF, Gardabaer (IS)

( * ) Notice: Subject to any disclaimer, the term of this patent is extended or adjusted under 35 U.S.C. 154(b) by 0 days.

(21) Appl. No.: 12/526,968

(22) PCT Filed: Feb. 26, 2008

(86) PCT No.: PCT/FR2008/000250
§ 371 (c)(1),
(2), (4) Date: Aug. 13, 2009

(87) PCT Pub. No.: WO2008/122721
PCT Pub. Date: Oct. 16, 2008

(65) Prior Publication Data
US 2010/0031767 A1    Feb. 11, 2010

(30) Foreign Application Priority Data

Feb. 28, 2007   (FR) ...................................... 07 01459

(51) Int. Cl.
*B25J 17/00*    (2006.01)
(52) U.S. Cl. .......... 74/490.05; 901/28; 901/48; 414/735
(58) Field of Classification Search ............... 74/490.01, 74/490.03, 490.05; 901/23, 28, 29, 48; 414/735
See application file for complete search history.

(56) References Cited

U.S. PATENT DOCUMENTS

| | | | | |
|---|---|---|---|---|
| 4,666,362 A | * | 5/1987 | Landsberger et al. | 414/735 |
| 5,271,290 A | * | 12/1993 | Fischer | 74/471 XY |
| 5,333,514 A | * | 8/1994 | Toyama et al. | 74/490.06 |
| 6,543,987 B2 | * | 4/2003 | Ehrat | 414/735 |
| 7,331,750 B2 | * | 2/2008 | Merz et al. | 414/735 |
| 2006/0182602 A1 | * | 8/2006 | Schuler et al. | 414/735 |

FOREIGN PATENT DOCUMENTS

| | | |
|---|---|---|
| EP | 0 250 470 | 1/1988 |
| EP | 1 129 829 A | 9/2001 |
| JP | 09 019883 A | 1/1997 |
| WO | WO 87 03528 A1 | 6/1987 |
| WO | WO 00 35640 A1 | 6/2000 |

\* cited by examiner

*Primary Examiner* — David M Fenstermacher
(74) *Attorney, Agent, or Firm* — Miles & Stockbridge P.C.

(57) ABSTRACT

A parallel-type displacement device having at least three arms each pivoting about a pivot axis, the pivot axes defining a polygon as seen from a point above the device, wherein each of the arms is actuated by an actuator and each of the arms is further connected to a head defining a small base through linking members respectively articulated on the head and the arm, each said arm and its respective head forming a hinge having two degrees of freedom such that the head always maintains its position and orientation, and in which in a neutral position, each arm is arranged so that, if drawing from the geometrical center of the polygon a straight line that is parallel to the pivot axis of any one of the arms, the straight line intersects that arm.

10 Claims, 13 Drawing Sheets

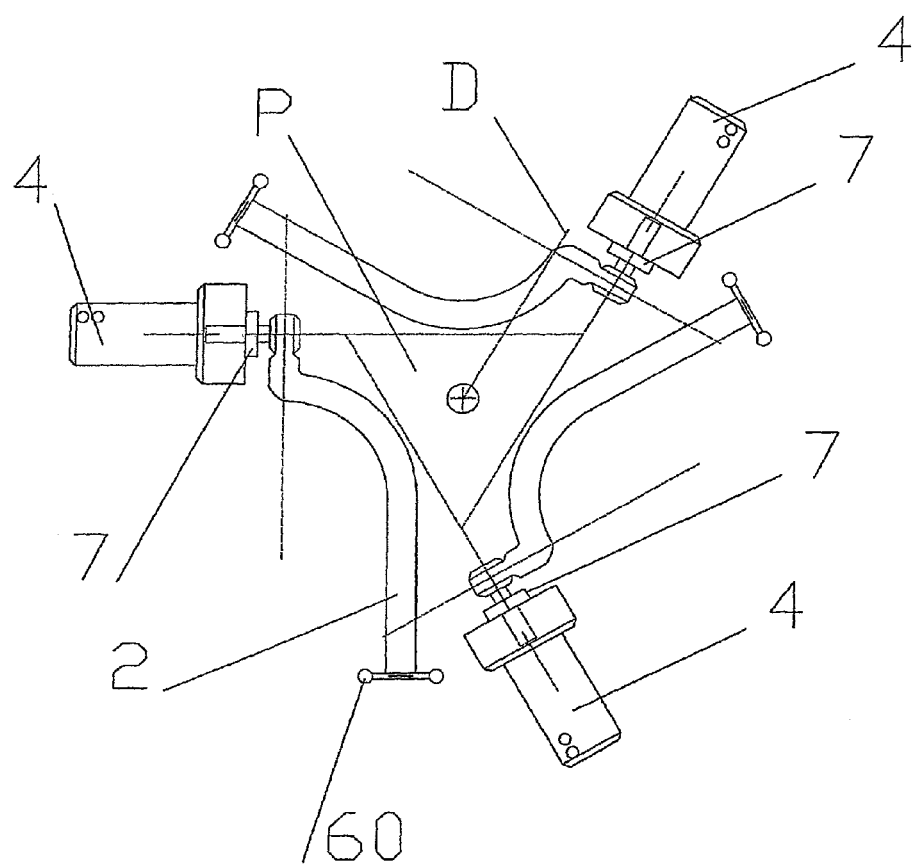

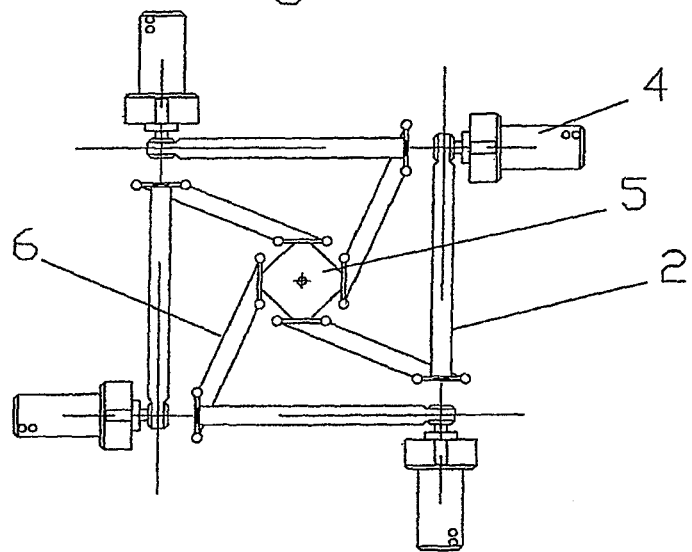

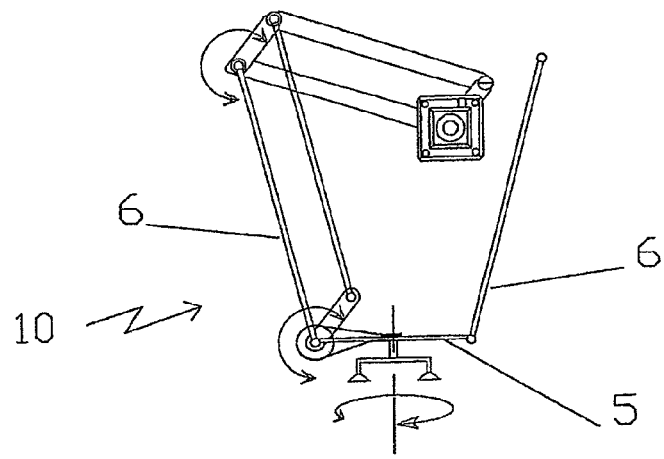
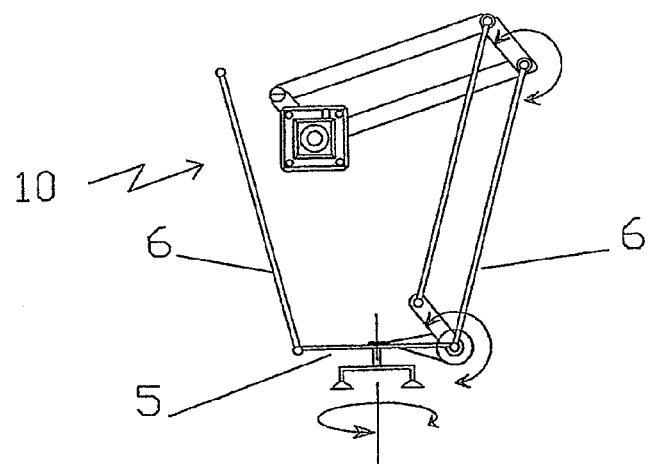

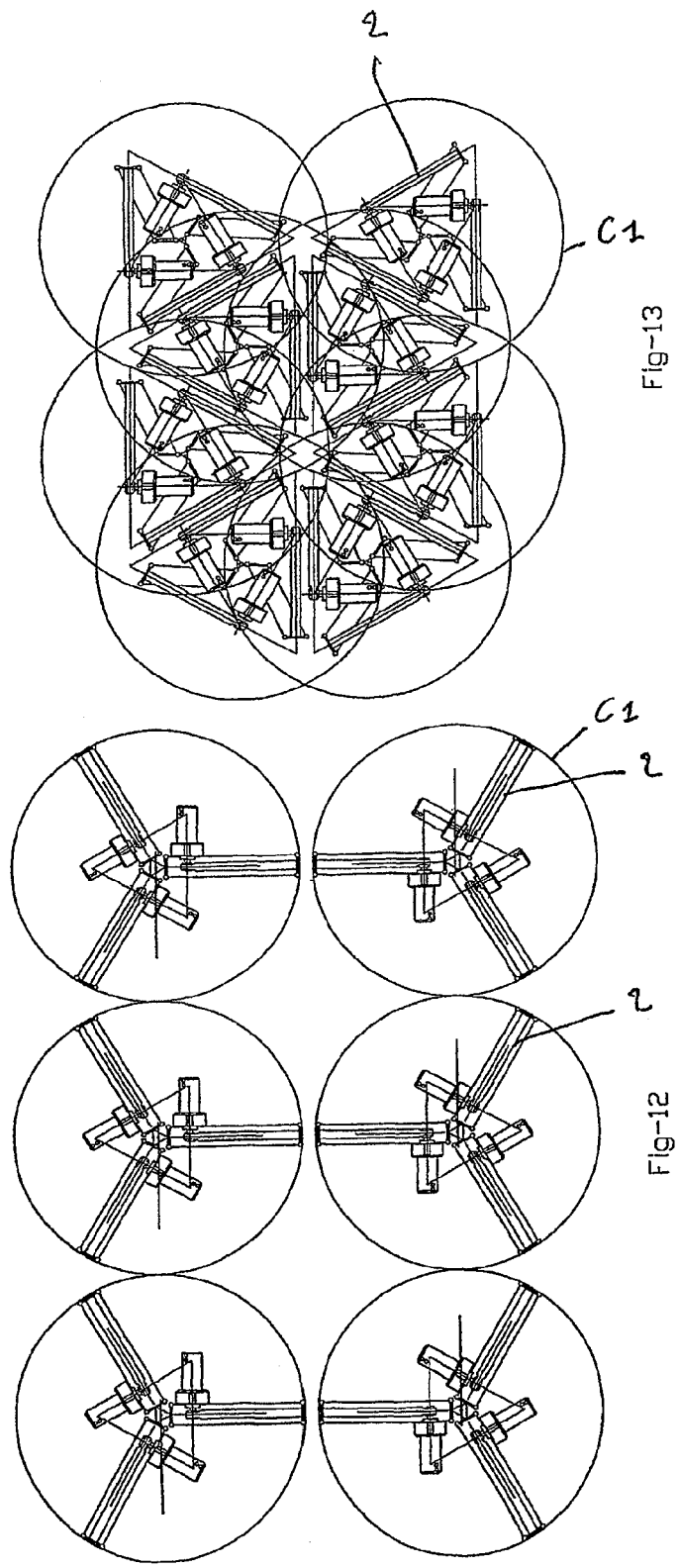

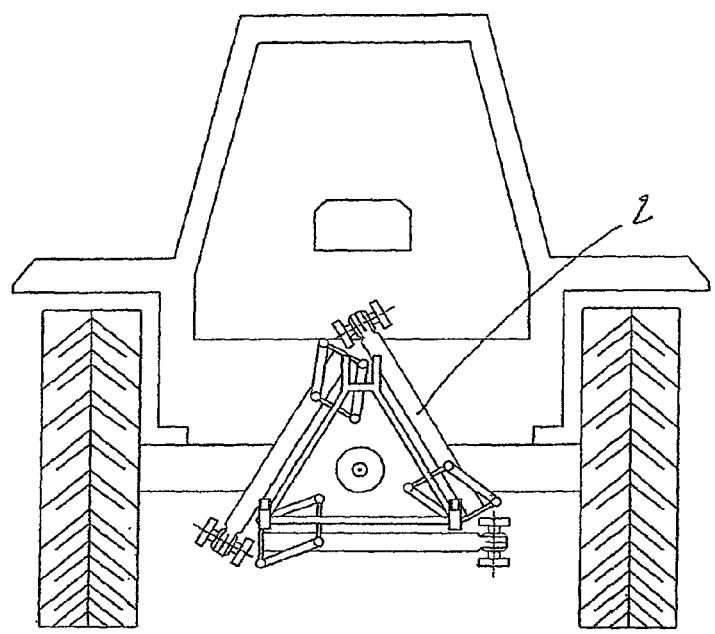
FIG-21-

COMPACT MANIPULATION ROBOT

FIELD OF THE INVENTION

The invention relates to a device for displacing an object in space.

BACKGROUND

To move an object in space, manipulation arms are known, the articulations of which are mounted in series and those the articulations of which are mounted in parallel. These arms are also called robots.

The robots of these serial articulation types have a disadvantage in that they are relatively heavy and thus have a high inertia which prevents them from working at high rates.

The so-called parallel robots enable much faster displacements but the amplitude of the movements is limited.

The invention relates to a so-called parallel robot.

Such robots are more particularly known from EP-A-250 470, EP-A 1.129.829, WO-A-0035640 including three actuators, including a fixed part and a movable part having only one degree of freedom with respect to the fixed part, with each movable part being connected to a movable head through linking members.

The device is shaped as a deformable pyramid with triangular bases.

Each actuator is an electric motor the rotation axis of which is coupled to an arm (the movable part) pivoting about the actuator rotation axis.

The private axes of the arms form a triangle and the linking members are respectively hinged on a head (the small base) and the corresponding movable part.

The articulations of such linking members to the arms as well as to the head are given two degrees of freedom.

Then, the orientation and the direction of the head are not modified in space.

Often, a telescopic transmission gripping device is mounted at the centre of the system.

A central support carries the actuators. This central support substantially has the same dimensions as defined by the three pivoting axes.

The rotation bearings of the pivoting arms are saddled on the pivot axes and are, each, half inscribed in the surface defined by the pivoting axes of the arms.

The arms are radial, at least in their end parts, and extend to the outside of the central support. The displacement amplitude is minimised by the extent of the support which must have a sufficient size to carry the actuators and often a fourth arm which is used as a gripping device connecting the larger base to the smaller base. The displacement amplitude is related to the useful length of the arm.

The overall dimensions are defined by the circle going through the ends of the arms when the system is in neutral position and the arms are then in the same plane, here a horizontal plane.

The axes of the arms are generally mounted so that the longitudinal axes of said arms intersect at the centre of the triangle formed by the pivot axes.

It should be understood that the larger the support for given overall dimensions, the smaller the length of the arms. Thus for the overall dimension of approximately 550 millimeters in radius, the length of the arm is 350 millimeters, the working height obtained is thus of the order of 300 millimeters and the diameter of the working area is of the order of 1,100 millimeters.

To increase the length of the arms for given overall dimensions, the size of the support should be reduced but it depends on the size of the actuators and in the configurations known, it cannot be much reduced.

Now, the overall dimensions must also be a factor taken into account for positioning said robots. In addition, reducing the size support also means for some of the possible positions of the arms, reducing the rigidity of all the movable members of the robot. Such constraints result in the present definition of the state of the art which is composed of parallel robots having a large fixed base and having arms radiating to the outside.

SUMMARY

The invention provides a device which is more compact.

For this purpose, the invention relates to a parallel-type displacement device including at least three arms each pivoting about a pivot axis, the pivot axes defining a polygon as seen from above, wherein each of the arm is actuated by an actuator and each of the arms is further connected to a head defining a small base through linking members respectively articulated on the head and the arms, the hinges having two degrees of freedom and the head always maintaining its position and orientation, this device being characterised in that in the so-called neutral position, each arm is arranged so that, if drawing from the geometrical centre of the polygon a straight line that is parallel to the pivot axis of any of the arms, such straight line intersects the arm considered.

BRIEF DESCRIPTION OF THE DRAWINGS

The invention will be better understood when reading the following description which is given as a non-limitative example and referring to the drawing showing:

FIG. 9: a fourth alternative with four arms
FIG. 11:
FIG. 10 as seen on the other side
FIG. 12: a production line with robots of the prior art as seen from above
FIG. 13: a production line with robots according to the invention as seen from above
FIG. 21: an application of a robot mounted at the back of a vehicle.

DETAILED DESCRIPTION

Figure 1:
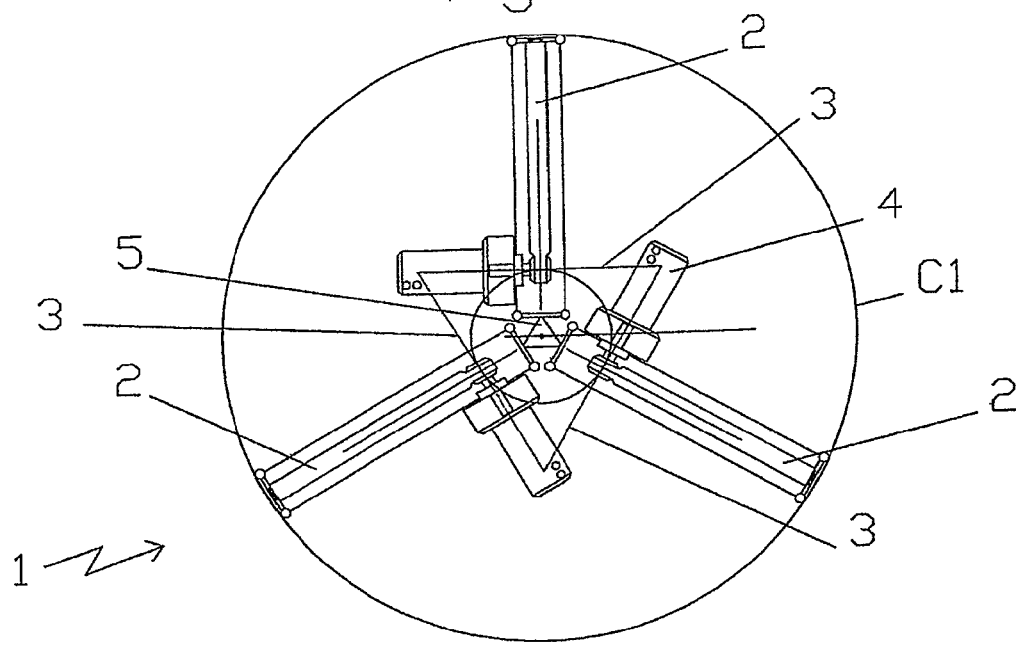
FIG. 1: Prior art

While referring to the drawing, a device 1 for displacing objects of the parallel-type can be seen.

This device makes it possible to displace objects at a high rate.

Conventionally, the device includes at least three arms 2 pivoting each about a pivot axis 3.

The pivot axis are either inclined with respect to a plane parallel to a head working plane. Generally, when the axes are inclined, they are shaped like a Chinese hat, the summit of which is directed upwards, but the tip oriented downwards is possible and has no effect on the invention.

As seen from above, the pivot axes or the projections thereof in a plane parallel to the head working plane form the sides of a polygon such as a triangle for three arms and a square or a rectangle for four arms.

The arms 2 are rectilinear or not rectilinear (FIG. 8).

For a better understanding the following description was written while considering that the private axes are in a horizontal plane.

An actuator 4 is at least indirectly engaged on one of the two ends of each pivoting arms, with each of these arms 2 being further linked to a head 5 through linking members 6 which are respectively articulated to the head and to the arm. These hinges 60 have two degrees of freedom.

The parallel-type displacement device is shaped like a kind of truncated pyramid which is deformable and has a large polygonal base including at least three arms 2 pivoting each about a pivot axis 3 guided in rotation on at least a bearing 7, each arm being actuated by an actuator 4 and each of these arms being further linked to a head 5 forming the small base through linking members 6 respectively articulated to the head and to the arm with two degrees of freedom, the head always keeping its orientation and direction.

In a so-called neutral position, the head is positioned above the projected surface and all the arms are horizontal which means parallel to a head working plane. The head working planes are parallel and non-concentric.

According to one characteristic feature, each arm is positioned so that it is possible from the geometrical centre of the polygon P to draw a ray parallel to the pivoting axis of any of the arms, with said line intersecting the considered arm.

The longitudinal axes of the arms form a triangle for a three arm configuration or for example a square (FIG. 9) when four arms are provided. The arms can be longer or shorter than the polygon sides.

This configuration of the arms can be seen when the arms are substantially in a plane parallel to the head working plane.

As a matter of fact, when the arms are closed to the vertical, the parallel line cannot intersect the arm.

Figure 2:
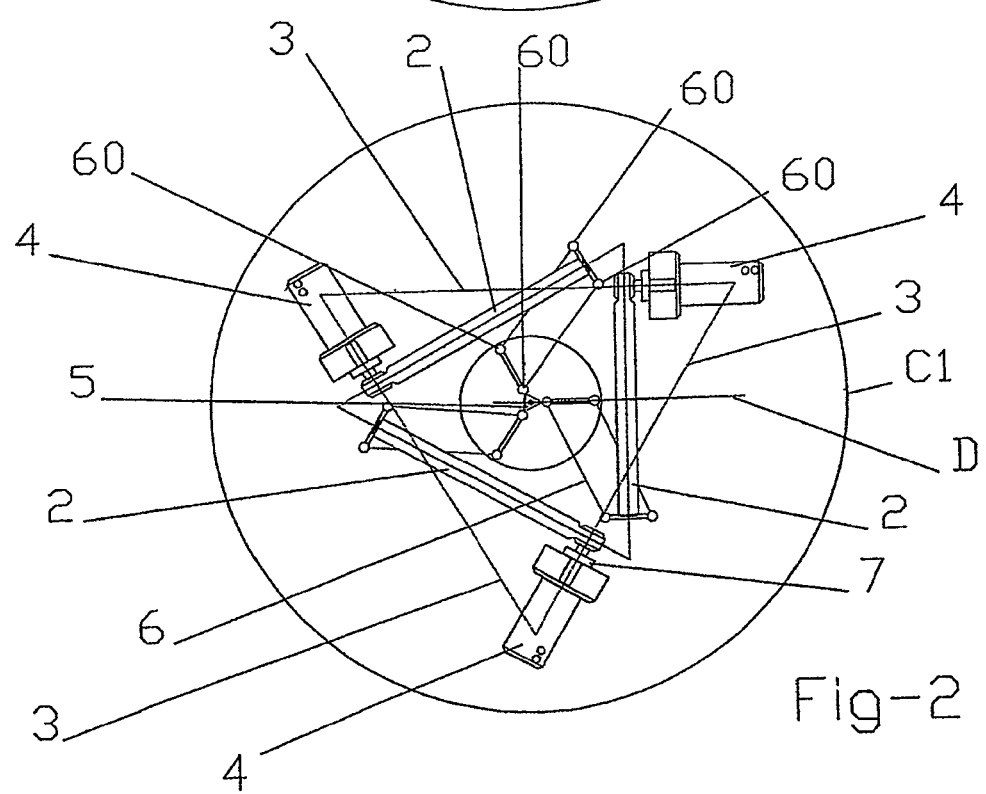
FIG. 2: a robot according to the invention
Figure 3:
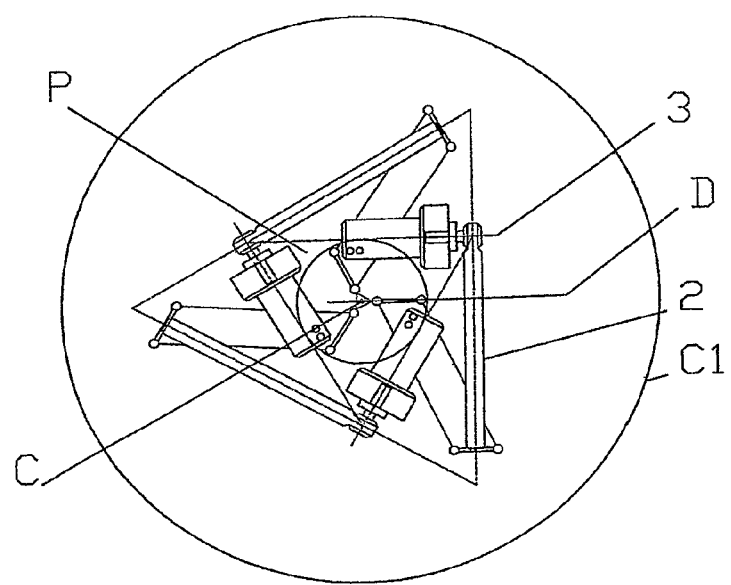
FIG. 3: the robot of FIG. 2 with the actuators being positioned inside

As can be seen, the actuators are mounted either outside the exemplary polygon in FIG. 2 or at least partially inside said exemplary polygon in FIG. 3. They can be positioned out of the plane intersecting this polygon.

When comparing FIG. 1 of the prior art and FIG. 2 which is that showing the new position of the arms, a difference appears in the overall dimensions.

The robots in FIG. 1 and FIG. 2 are substantially on the same working area in x, y, z but the robot of FIG. 2 is more compact.

In FIG. 1, the overall dimensions are shown by circle C1 which has been reproduced in FIG. 2. It can be seen that for arms having the same length the overall dimensions are more reduced in the embodiment of the invention.

It can also be seen that such overall dimensions can be reduced again if the actuators are positioned inside the triangle defined by the longitudinal axes of the arms.

Figure 14:
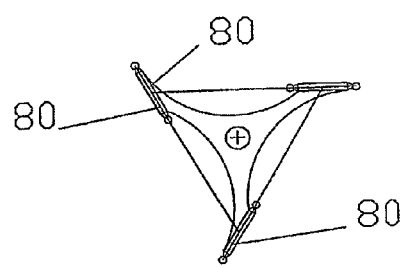
FIG. 14 to 16: examples of heads
Figure 15:
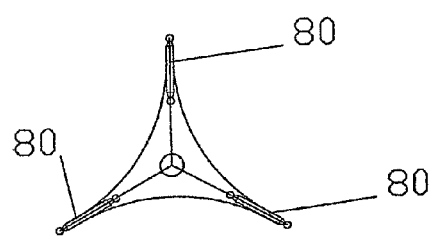
Figure 16:
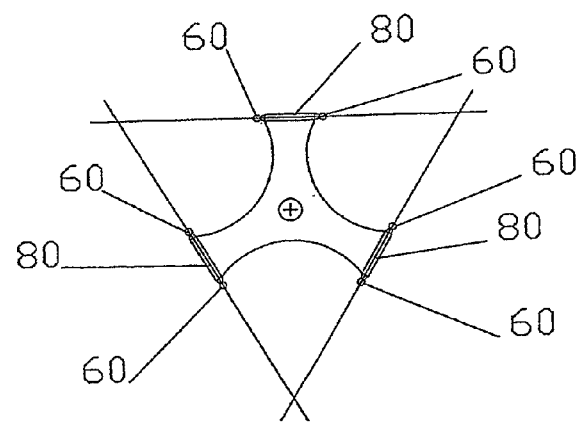

Examples of heads 5 are shown in FIGS. 14, 15 and 16.

In the example of FIG. 15, transversal parts 80 linking the two lower articulation points of the linking members to the head are positioned radially with respect to the head.

In the versions of FIGS. 14 and 16, the longitudinal axes of these transversal parts define a triangle.

In FIG. 14, the fastening point of the transversal parts is at the apex of the triangle whereas for FIG. 16 the fastening point is positioned in the middle of the triangle side. The axes of these transversal parts can be parallel or inclined with respect to the head working plane 5.

In some alternative solutions the linking members can be rectilinear, but in other solutions, they can be bent or S-shaped. Advantageously, ball sockets 60 made of ceramic will be used at the articulation points with the linking members. It can be useful to provide the ball sockets with an overpressure device and the bearings with sealing devices in dusty or moist environments in order to prevent them from being soiled or damaged.

Considering the very heavy accelerations which can be imparted by the operator, it can also be useful to double the fastening points of the linking members with safety cables or any other element of the same utilisation. The linking members can have a round, oval or polygonal section with simple or assembled wires.

It can be seen that the device includes a gripping device 10 with a telescopic transmission. This gripping device is mounted at the centre thereof (the centre of the three side pyramid when the latter is at its zero point, with the arms being in the same plane as the pivoting axes).

The gripping device is guided in rotation on the head of the device.

An additional actuator can have the gripping device rotate about its longitudinal axis.

The gripping device may be provided with a suction cup, claws or any other means for gripping an object.

The gripping device often has a variable length between two fixed points, i.e. the end hinges and it is also composed of an actuator, a high hinge, a telescopic transmission (two rods sliding one into the other), a lower hinge (a cardan or a ball socket) positioned on the head and a gripping member.

Advantageously, the upper hinge is positioned above the plane A containing the arms when these are in a horizontal position. This means, with respect to the plane A, that it is positioned in the space opposite that containing the head. Or the plane A is positioned between the upper hinge and the head.

The actuators are for example, electric motors known as "brushless" motors but these could be different means. They can be mounted at the end of the axis but a transmission through a toothed belt or any other belt makes it possible to position them in a different plane.

Figure 10:
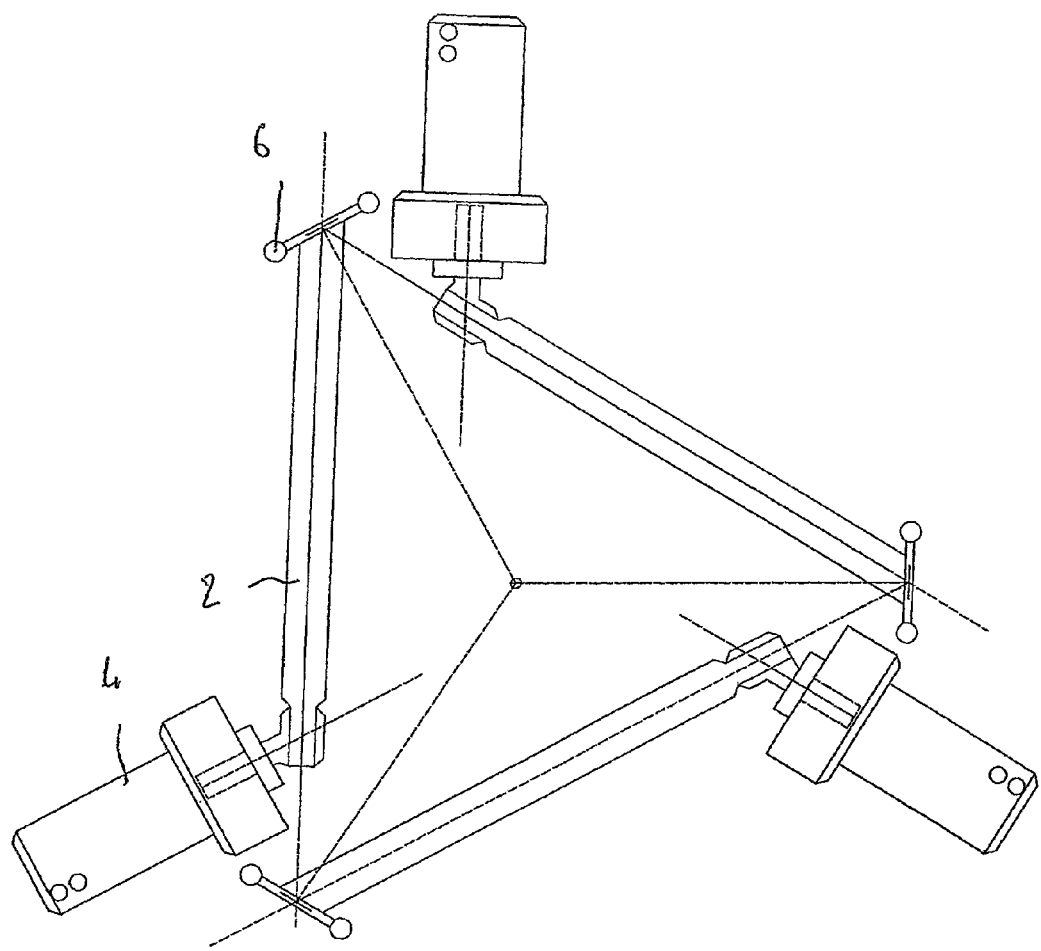
FIG. 10: an exemplary control of the gripping device

This gripping device can be connected to its actuator not by a telescopic transmission but by a parallel kinematic link (FIG. 10-11) with a gear reduction system, or by a cable control and a gear reduction system.

The actuator of this gripping device can also be directly mounted on the head but then the weight is increased and so is inertia.

As can be seen, one of the advantages of this device is that it is compact with respect to its working area. Just refer to FIGS. 12 and 13 to compare the overall dimensions on a production line.

This compact characteristic makes it possible to provide the robots with many tools and can even result in robot matrices in FIG. 12.

When keeping in mind that for "pick & place" applications for the packaging of manufactured products, one travel of the robot out of two is generally carried out unloaded, all the interest of providing the robots as close to each other as possible clearly appears, which gives at certain points of the space the superposition of their respective working areas. A system for managing the thus obtained robot group will enable all the robots to work together in harmony and without bumps.

Figure 4:
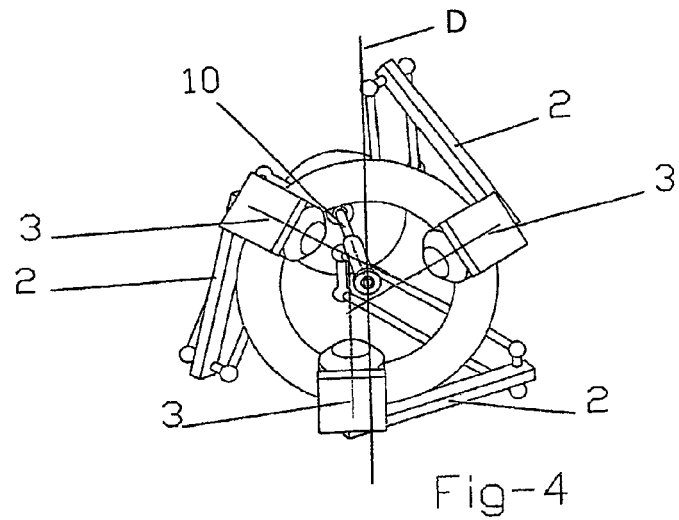
FIG. 4: an alternative robot with inclined axes
Figure 5:
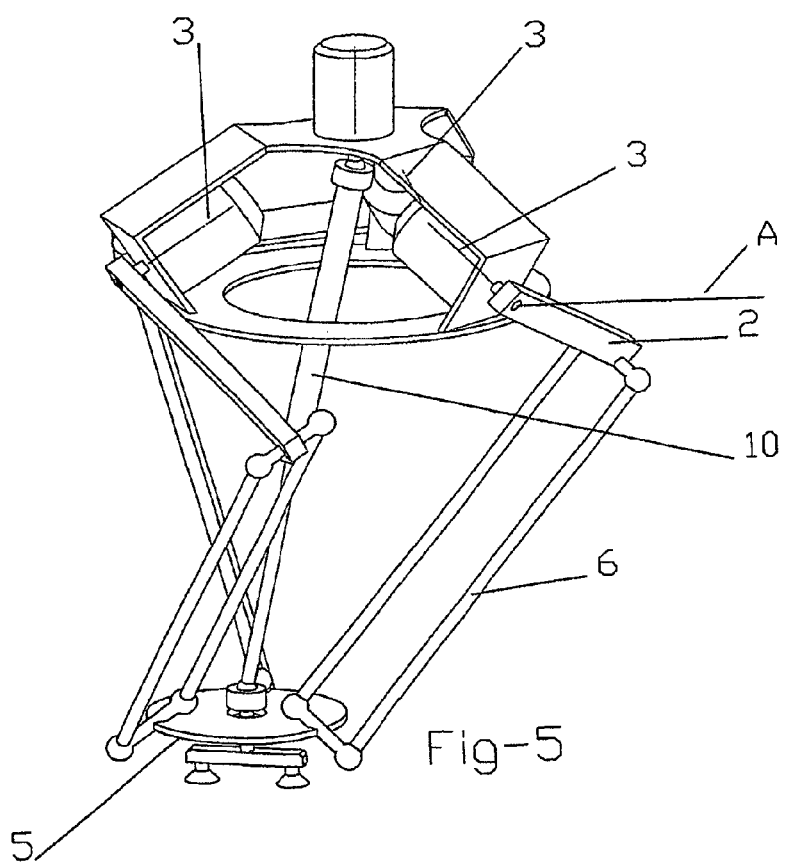
FIG. 5: a perspective view of the robot of FIG. 4
FIG. 6: another alternative robot
Figure 6:
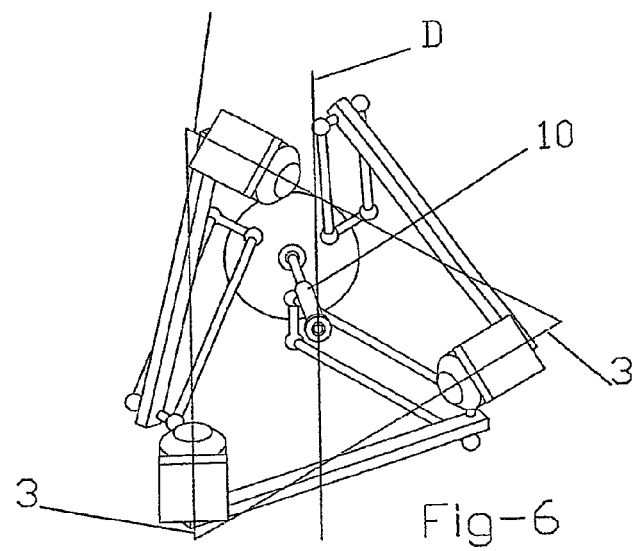

It should be noted that in FIG. 4 or 8 the bearings 7 of the actuators are positioned outside the polygon formed by the pivoting axes.

Figure 17:
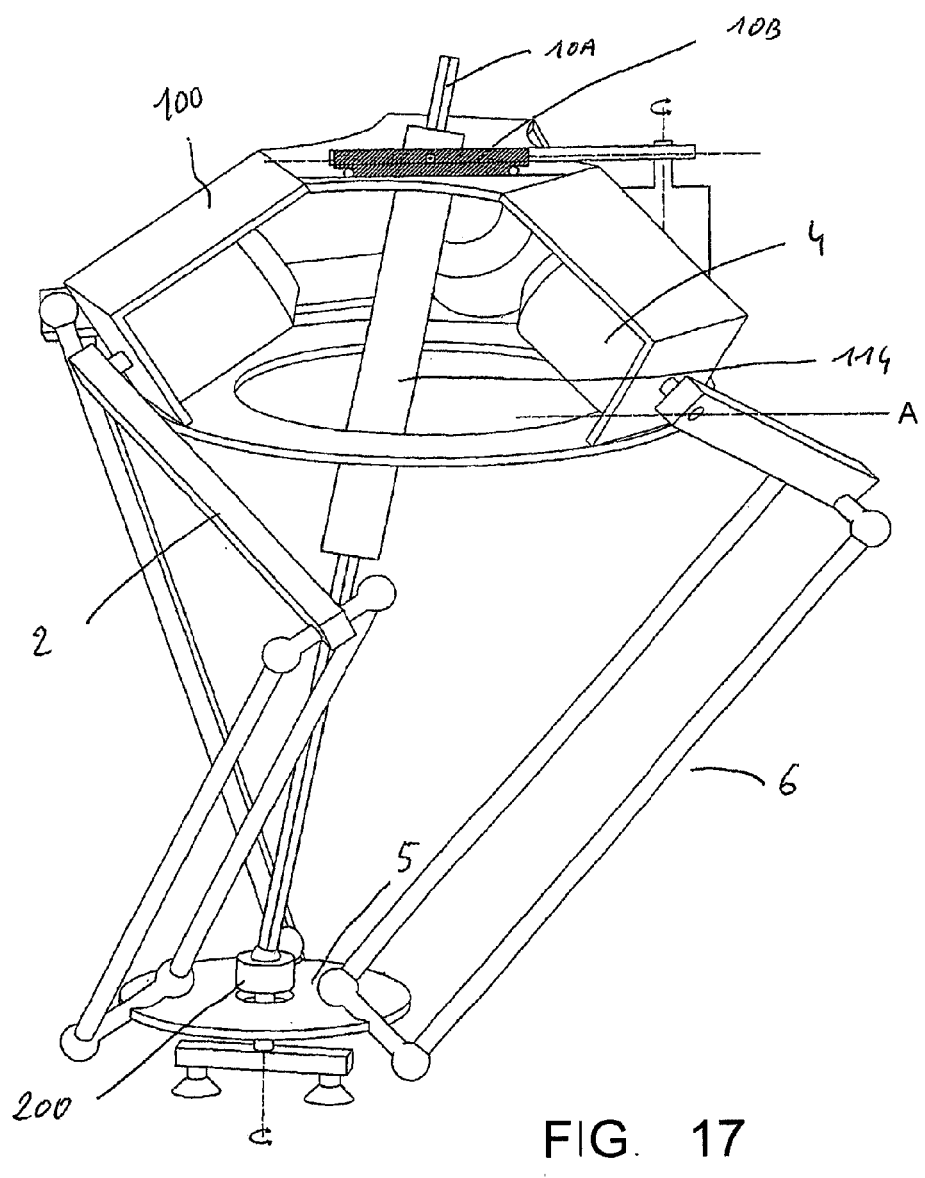
FIG. 17: an alternative robot

FIG. 17 shows an exemplary support 100 on which the motors 4 and the arms 2 supporting the long members 6 are mounted.

Figure 7:
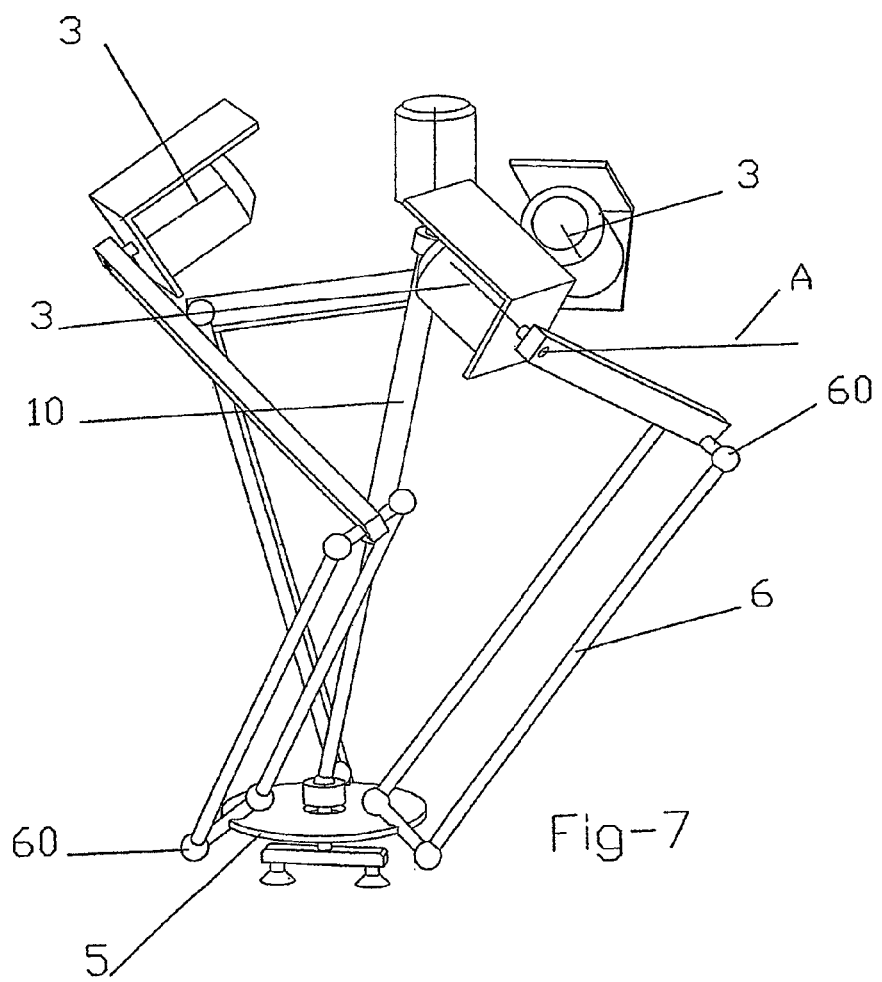
FIG. 7: a perspective view of the robot of FIG. 6
FIG. 8: a third alternative with non rectilinear arms

FIG. 17 shows a robot provided with a gripping device 10 which is different from that shown for example in FIG. 7.

It is composed of an element 10A having a non variable length and connected to the head 5 through a hinge 200, for example of the cardan type. This member 10A has its free end slidingly engaged in an articulated guiding mean 10B which it goes through.

This free end 10C is not immobilised at a fixed point, it is free to move in space.

This guiding means is for example composed in concentric rings.

Figure 19:
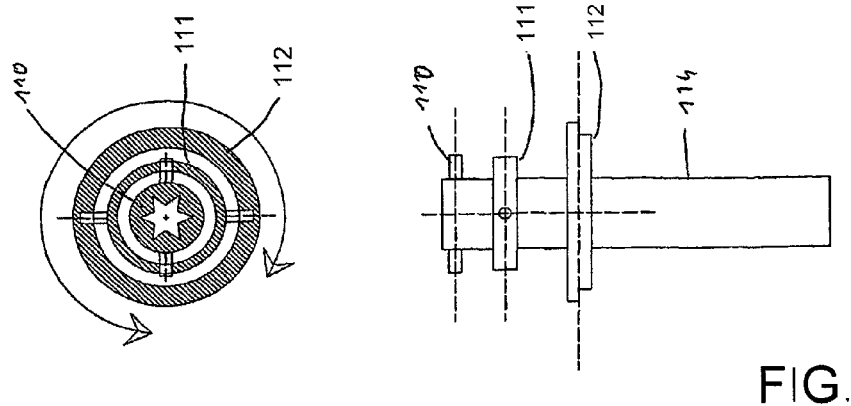
FIG. 19: an alternative guiding means of FIG. 18
FIG. 20: arms of a robot according to another position as seen from above
Figure 18:
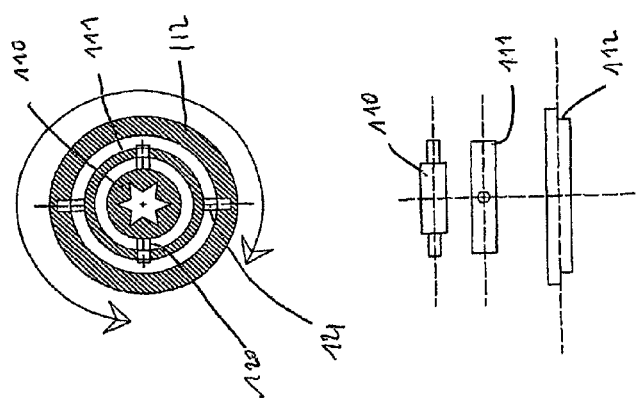
FIG. 18: a gripping device guiding means

FIG. 18 or 19 shows in the upper part of the drawings the rings as seen from above and mounted with the axes 120 and 121 and in the lower part the non mounted rings.

An internal ring 110 articulated about the diameter axis 120 of a second ring 111 which is itself articulated about a diameter of axis 121 at 90° from the previous one on an external ring 112 which is indirectly or directly used as a driving ring. A cut is provided in the support 100 for the passage of the long member 10A. This long member 10A is locked in rotation in the internal ring 110.

The guiding means is not very thick (FIG. 18) or the internal ring is extended by a liner 114 towards the head 5 which increases the guiding length (FIGS. 17 and 19).

The rings can be replaced by some kind of ball socket.

The robots are often shown hanging but they can be mounted on a support or even on a vehicle such as a trailer or a manipulation instrument and work in a plane perpendicular to the ground.

The invention claimed is:

1. A parallel-type displacement device, comprising:
    at least three arms each pivoting about a pivot axis, the pivot axes defining a polygon as seen from a point above said device,
    wherein each of the arms is actuated by an actuator and each said arm is further connected to a head defining a small base through a pair of linking members respectively articulated on the head and on the arms,
    each said arm and its respective head connection forming a hinge having two degrees of freedom such that the head always maintains a same orientation and inclination,
    wherein in a neutral position, each arm is arranged so that working planes of said head are parallel with respect to each other and are non-concentric with respect to the pivot axis of any one of the arms,
    wherein each said pair of linking members is connected to said head via a transversal part,
    wherein a first end of said transversal part is attached to an end of one of said pair of linking members and a second end of said transversal part is attached to an end of the other of said pair of linking members, and
    wherein points of attachment of said first ends of said transversal parts to respective ones of said pair of linking members form a first plane parallel to said working planes of said head, and points of attachments of said second ends of said transversal parts to respective ends of the other of said pair of linking members form a second plane parallel to said working planes of said head, said first and second planes being disposed at opposite sides of said working planes of said head.

2. The parallel-type displacement device according to claim 1, wherein the pivot axes are in the same plane.

3. The parallel-type displacement device according to claim 1, wherein the pivot axes are inclined with respect to a horizontal plane parallel to a head working plane.

4. The parallel-type displacement device according to claim 1, wherein the actuators are positioned outside the polygon formed by the pivot axes.

5. The parallel-type displacement device according to claim 1, wherein the actuators are at least partially inside the polygon formed by the pivot axes.

6. The parallel-type displacement device according to claim 1, wherein the transversal parts which connect two bottom articulation points of connecting elements to the head are arranged radially with respect to the head.

7. The parallel-type displacement device according to claim 1, wherein the arms are not rectilinear.

8. The parallel-type displacement device according to claim 1, further comprising bearings which are outside the polygon.

9. The parallel-type displacement device according to claim 1, further comprising a gripping device including a long member fixed at one end to the head by a hinge, with another end being free.

10. The parallel-type displacement device according to claim 9, wherein the long member is further guided in translation by guiding means which said long member passes through.

* * * * *